United States Patent [19]

Monreal

[11] Patent Number: 4,678,445
[45] Date of Patent: Jul. 7, 1987

[54] WATER AND SNOW WISHBONE SHAPED SLED FOR ONE OR TWO

[76] Inventor: F. Javier Monreal, 4242 Barker Hill Rd., Jamesville, N.Y. 13078

[21] Appl. No.: 806,423

[22] Filed: Dec. 9, 1985

Related U.S. Application Data

[63] Continuation-in-part of Ser. No. 751,599, Jul. 2, 1985, Pat. No. 4,603,870, and Ser. No. 672,813, Nov. 19, 1984.

[51] Int. Cl.$^4$ .............................................. A63C 15/00
[52] U.S. Cl. ....................................... 441/72; 441/65; 280/18
[58] Field of Search .................. 441/65, 66, 67, 72, 441/74, 79; 280/12 F, 15, 18, 12 B; 114/346; D21/228

[56] References Cited

U.S. PATENT DOCUMENTS

| | | | |
|---|---|---|---|
| 3,139,055 | 6/1964 | Nutting | 441/65 |
| 3,156,483 | 11/1964 | See | 280/18 |
| 3,183,530 | 5/1965 | Girden | 441/65 |
| 3,522,952 | 8/1970 | Uttenthaler | 220/12 R |
| 3,576,331 | 4/1971 | Greene | 280/18 |
| 3,950,807 | 4/1976 | Sharpe | 441/79 |

Primary Examiner—Galen Barefoot
Assistant Examiner—Thomas J. Brahan

[57] ABSTRACT

This is a sporting wishbone or Y-shaped board for supporting one or two riders in sliding over water or snow. The single bottom arm of the Y is as wide as the combined width of the two front arms of the Y plus the space in between, or approximately 16" to 18", being the total length of the slde 5' to 6'. The medial edges of the two front arms have a built up lip that gently starts from zero at their front tips and slowly becomes 3" to 4" tall near the crotch of the Y-shaped sled. At the very crotch, this built up lip is humped up 14" off the flat bed of the sled to form a racing bicycle seat-like cusp. The widest, single arm of the Y, smoothly curves upward towards the end of the sled forming a gentle letter S in longitudinal section, being the end of this curved up elevation approximately 14" over the flat bed of the sled. Symmetrical sets of fixed, soft straps are placed at various points to hold the rider's feet in the different positions possible for one or two riders for facing either opposite end of the sled. A small, downward pointing stabilizing fin is provided below the wide section.

9 Claims, 11 Drawing Figures

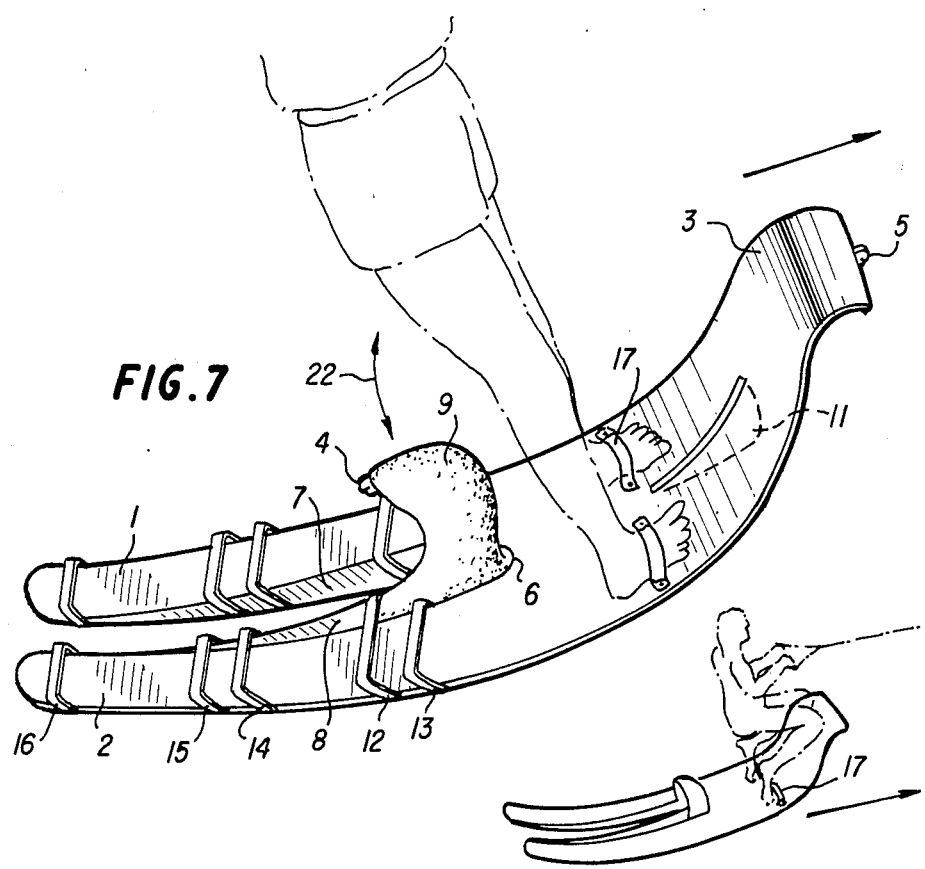
FIG. 7
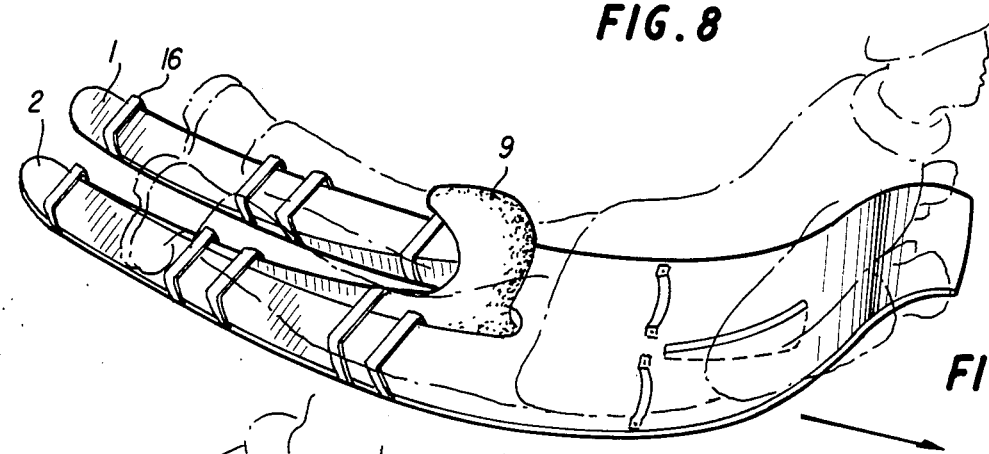
FIG. 8
FIG. 9
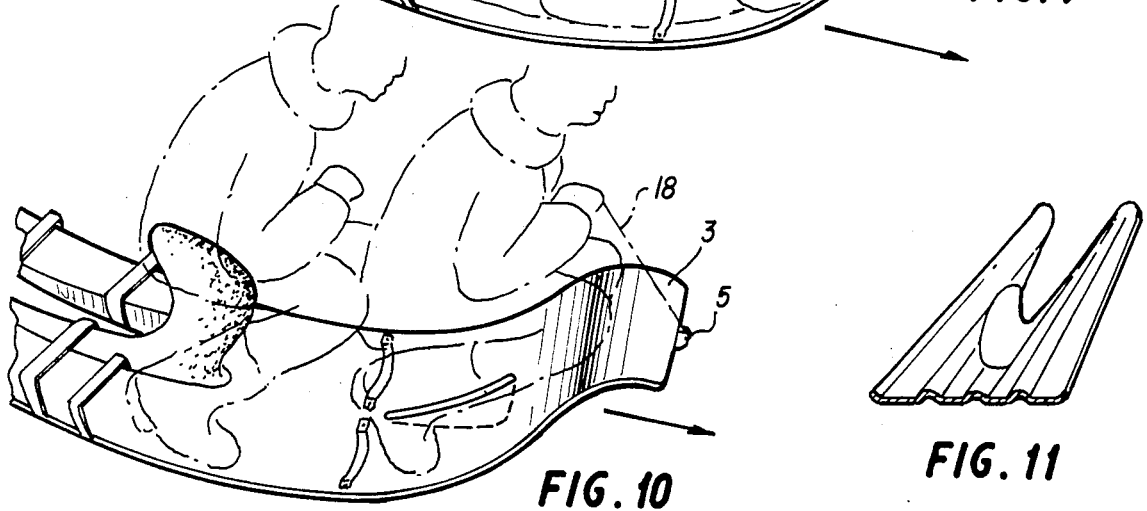
FIG. 10
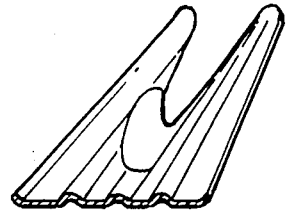
FIG. 11

WATER AND SNOW WISHBONE SHAPED SLED FOR ONE OR TWO

This patent application is a continuation-in-part of the two earlier applications Ser. No. 06/751,599, filed July 2, 1985, now U.S. Pat. No. 4,603,870 and Ser. No. 06/672,813, filed Nov. 19, 1984, still pending.

BACKGROUND AND PURPOSE

Currently, water gliding atop some sort of floating board is practiced in different forms, some involving a motorized means of traction via a tow rope (using a single or paired water skis, and more recently oval-shaped knee-boards), others involving the moving action triggered by the wind or by the ocean waves (surfing). Over packed snow or ice one slides down either positioned over standard-shaped snow skis or sitting (or laying) on a roughly rectangular board or basket that may or may not have gliding runners underneath. Though theoretically some of the skis and sleds or gliding boards would be suitable for a sporting use on snow or on water, their particular width, or weight or buoyancy makes the water skis or boards impractical for the snow and viceversa. Additionally, the existing devices are intended for one exclusive position (i.e. snow skis for standing, knee-boards for kneeling only, etc.). Furthermore, ordinary water or snow skis can be used by only one user at a time and only the rectangular snow sleds of children, or larger competition sleds (such as Bob-sleds) can carry two individuals.

This invention circumvents some of those limitations by its whishbone shape that makes it a hydrid between a separate pair of skis and a sled. It offers the stability and easy anchor of the user provided by wide sleds and wide water gliding boards, it permits several positions such as standing, sitting, laying and even kneeling, and it allows, within an approximate length from front to back of 6', one or two riders. Furthermore, because of its split front half, it approximates the maneuverability of separate skis due to some elasticity or give of such front end, and when the rider lays down or sits in the back, he or she can keep the tow rope between the two front sections.

Revision of prior art reveals Lake's Snow and Water Skimming Device (U.S. Pat. No. 3,689,092) which offers a separate pair of skis for each lower leg so the skier rides in an extreme low kneeling position; the Water Sport Device of Drennen (U.S. Pat. No. 3,435,471) that consists of a curved rectangular board for the water skier or glider to kneel on; Forney's Knee Sled that only allows a high kneeling position of the user while resting his/her thighs on an inclined semi-sitting rest (U.S. Pat. No. 2,480,406); Morgan's Knee Engaging Ski (U.S. Pat. No. 4,353,573) that uses two separate ski boards with stops for the knees and for the feet; Pendleton's Body Sled (U.S. Pat. No. 4,413,832) has esentially a curved and padded rectangular shape and only accommodates one user and only in prone position; Prade et al. Foot-loops on Surfboards (U.S. Pat. No. 4,466,373) deal with water and wind surfing boards but only with the means of strapping or anchoring the user's feed to the board; Taylor's Multipurpose Slide (U.S. Pat. No. 4,028,761) describes esentially a water gliding knee board, primarily in use nowadays as such while pulled by a motorized boat, though its inventor claims that it is suitable for snow gliding and the reality proves that it is much too heavy for children to carry it back up the snow bank plus its limitations in maneuverability in the snow.

In essence, none of the mentioned devices patented to this date offers the versatility of use, of position and of number of occupants possible with this wishbone-shaped sled, hybrid between a pair of skis and a sled.

BRIEF DESCRIPTION OF THE INVENTION

This device described as Water and Snow Wishbone Shape Sled for One or Two (Occupants) consists of a light weight (i.e. floating) single piece board, so shaped in a top view outline as a wishbone or letter Y. The top part of the Y consists of two arms or parallel ski-like members, symmetrical to one another. The bottom half of the Y is a wider rectangular flat bed gently curved towards the end of the said Y so in a lateral view it has a gentle longitudinal section profile of a letter S. At mid section of such rectangular bed or widest part of the sled, and set longitudinally with the long axis of the sled, there is an extruded fin that projects downward to aid in stabilization of the ride on water. The medial edges of the two parallel ski-like members have, facing each other, an upward gently prodruding lip. The height of such lip gently tapers off towards the end tip of each ski board and gently protrudes more and more towards the crotch of the sled, crotch area where the protruding lips of each ski board member become in a swift U curve a continuation of one another. At the crotch of the sled, the said U-shaped protruding lip is smoothly built up to form a hump or cusp that is shaped as its top as a standard racing bicycle seat. The approximate dimensions of this wishbone shaped sled are 5' to 6' from front to back and 16" to 18" wide. The humped or cusped seat at the crotch stands approximately 14" from the flat bed of the sled. The respective length of the ski-like members from their front tips to the crotch of the sled is 36" to 42" or between ½ and 3/5 of the total length of the sled. Were the sled on a flat, dry ground the upward gently curved rectangular wide part of the sled raises off the ground at its end approximately 14".

Symmetrical sets of soft and elastic rubberized fixed straps are placed conveniently over the ski-like boards to provide a hold for the rider(s) feet, primarily when pulled or towed on the water. Obviously no strapping is necessary, or advised, when children use it down a snow slope and no force is pulling the rider away from the sled as when water skiing.

BRIEF DESCRIPTION OF THE DRAWINGS

FIG. 7 is a perspective view of the same instant invention having a standing rider facing the opposite direction of FIGS. 1 through 6.

FIG. 8 is a miniaturized view of the same FIG. 7 with a kneeling rider.

FIG. 9 is a perspective view of the same instant invention used in downhill snow-sledding with the prone-reclined rider facing as in FIG. 7.

FIG. 10 is a perspective view of the same instant invention snow-sledding downhill with two riders and facing the sled as in FIGS. 7 through 9.

FIG. 11 is a miniaturized perspective view of the same instant invention facing its humped-up seat and front ski members in a cross section just behind the seat and showing the longitudinal ribbing-grooving.

DETAILED DESCRIPTION OF THE PREFERRED EMBODIMENT

Figure 3:
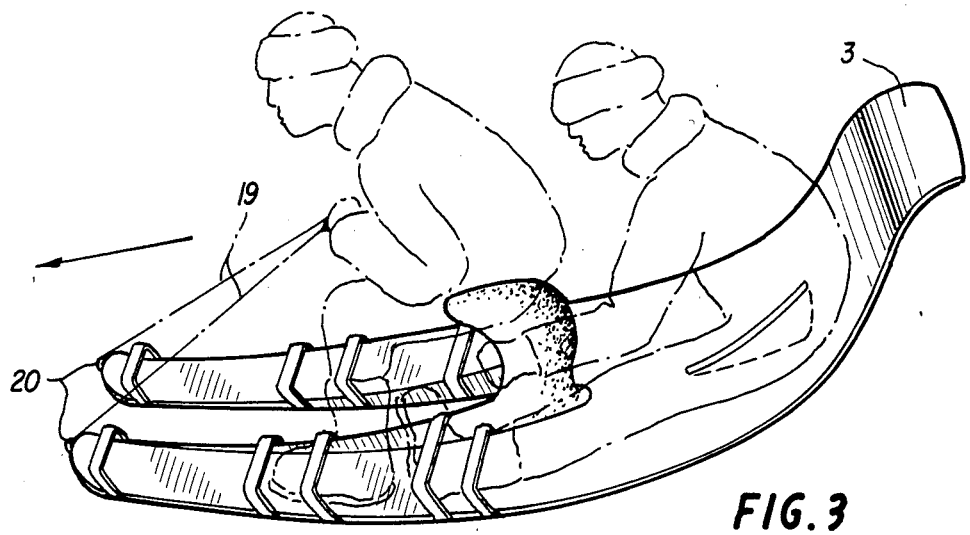
FIG. 3 is a left lateral perspective view of the same instant invention with two children sitting thereon and sliding down a snow slope.

As seen in FIGS. 1 through 10, the sled of the present invention is shown supporting one or two riders in various positions of laying (prone or supine), sitting at the middle or at one end, kneeling at the middle or at one end, standing, and facing either end of the sled. In FIGS. 1, 2, 4, 5, 6, 7 and 8 the sled is shown as the rider(s) might use it for gliding over water and towed by a rope that is pulled by a motorized boat. In FIGS. 3, 9 and 10 the sled is shown as the rider(s) might use it for recreational sliding in the Winter over snow or ice. FIGS. 1 through 6 show the rider(s) facing the two ski-like arms of the wishbone or Y-shaped sled identified by the numerals 1 and 2. FIGS. 7 through 10 show the rider(s) facing the opposite or wide, rectangular and up-curved end of the sled identified by the numeral 3.

The rider(s), specially children using the sled in playful activities do not need any strapping or securing to the sled and the inventor does not recommend that the children use the provided straps when the sled is used for sliding on snow or ice. In this situation, both the sled and the rider(s) move downhill by gravity and nothing pulls the rider(s) away from the sled, so in a tumble one should not have the foot holding on to the sled thus making the sled safest (understanding the relative risks of personal injury possible in all sports that involve some speed). When the sled is used for aquatic sports that involve speeding over the water mounted on the sled and one of the riders holds on to the tow rope, it is obvious that the pulling force tends to separate the rider from the sled, thus holding straps for the rider's feet are provided in various symmetrical locations. If the two rope is hooked directly to the sled at points identified in FIGS. 1 and 7 by the numerals 4 and 5, no separation force is present and thus no use of the straps is necessary either as when used in the snow.

Figure 1:
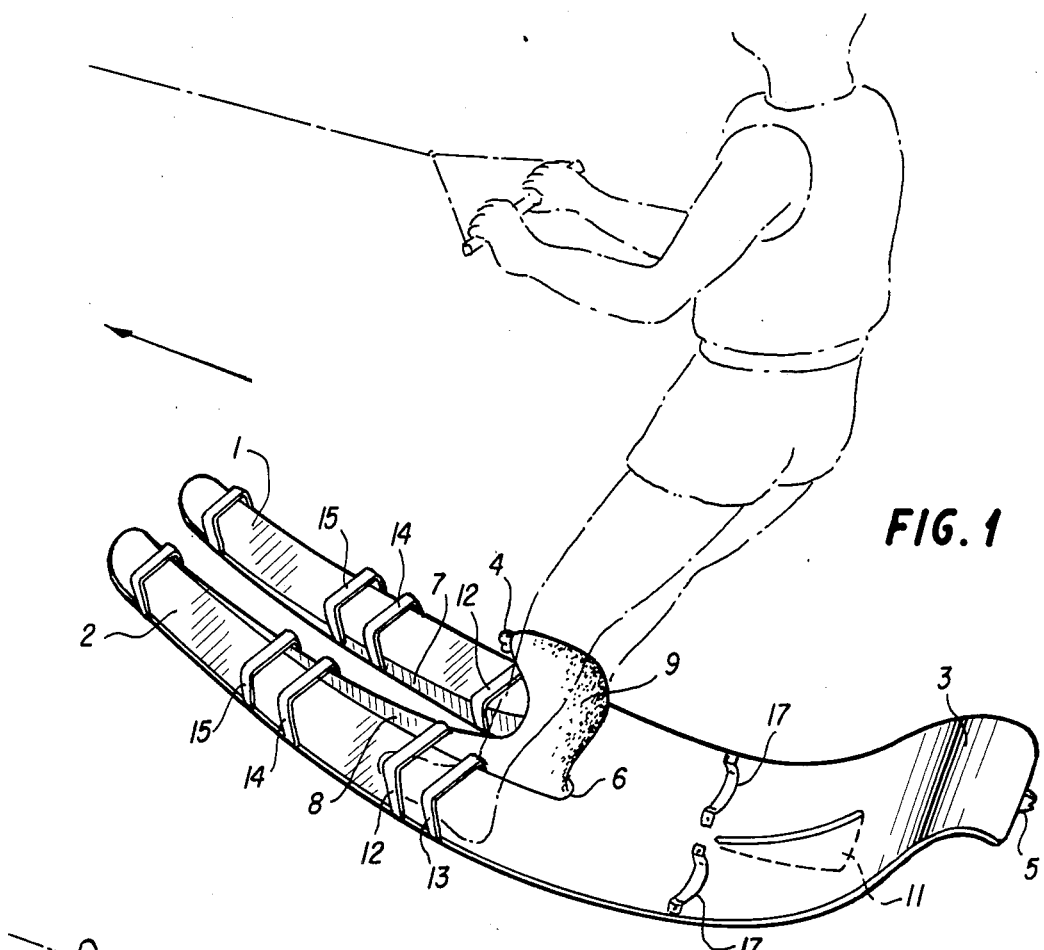
FIG. 1 is a perspective view of the instant invention having a standing rider thereon towed by a powered water vehicle.
Figure 2:
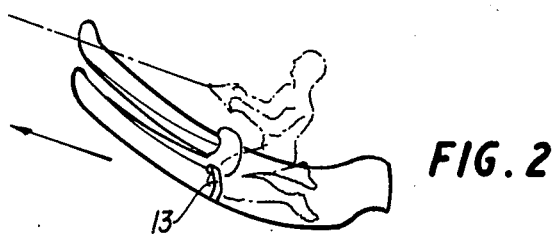
FIG. 2 is a miniaturized drawing of the same, in a left lateral perspective view showing the rider in a kneeling position.

The sled per se with its main three sections 1, 2 and 3, has as the title of the invention expressly states, a forklike, Y-shape or wishbone shape, being the sections 1 and 2 a pair of ski-like members, symmetrical to one another connected to one another at a near mid point of the sled or crotch (numeral 6 in FIGS. 1 and 7). From the crotch 6 to the hook 5, the third section of the sled (numeral 3) has a flat surface configuration (or slightly concave, basket or boat-like configuration with up-curved outer edges) from side to side, but from the crotch 6 to the hook 5 section 3 curves up smoothly so in a longitudinal section it has a gentle S shape. If one lays the sled flat on dry ground with the mid section of the ski members 1 and 2 touching the ground, the point of maximal elevation of the S-shaped section 3 is approximately 14" high over the ground.

Though miniaturization and enlargement of the sled to accomodate only one small child in a miniature sled, or several riders in a large sled, is possible and would only represent a logical sequitur of this invention, the approximate dimensions proposed here for this sled are as follows: Overall length from the front, up-turned tips of the ski members 1 and 2, to the end of the wider section 3 at hook 5, the sled is 5' to 6'. With this length, its total width at the section 3 in the back or with the ski-like members in the front plus the space in between, is 16" to 18". Each ski-like member 1 and 2 is approximately 5" to 6" wide and their length from front free end to the crotch of the sled is between ½ and 3/5 of the total length of the sled. Sections 1, 2 and 3 are together one piece. As in an ordinary water or snow ski, both ski-like members 1 and 2 have a smoothly up-turned front free tip, preferably rounded to avoid injury in the case of a tumble.

Each ski-like member 1 and 2 have an up-turned lip at the medial edge that is next to each other, upturned lip that is identified by the numerals 7 and 8 for each respective 1 and 2 member in FIGS. 1 and 7. These up-turned lips 7 and 8 start from zero at the free end of each ski member and smoothly become 3" to 4" tall as they near the crotch of the sled. At the very crotch of the sled these lips 7 and 8, in a sharp but rounded U-turn become a continuation of one another. In the area in front of the crotch 6, the U-turn of the lips 7 and 8 becomes 14" elevated into a humped cusp or seat identified in FIG. 9 by the numeral 9. This seat 9, with the lips 7 and 8 is a single piece with the rest of the sled.

The whole sled can be cast as a single piece injection-molded slippery plastic such as polyethylene or polypropylene sheeting. If its injection molded, the shape of the humped up seat 9 can be as the seat of a racing bicycle in its top surface (i.e. smoothly elongated) or, wider in cross section as the wide seat 10 shown in FIGS. 4 and 5 only. The wide seat 10 has the advantage of more comfortable seating and it allows a high kneeling position (not shown in the figures), but has the disadvantage of more difficult and costly manufacturing, plus it offers, on its sides, an obstruction in a tumble, with a possible cause of injury, when one kneels as in FIG. 2, or when one sits or lays as in FIGS. 3, 4 and 6. With the narrower seat 9 (depicted this way in all the figures except for FIGS. 4 and 5), in a tumble it is easier for the rider's crotch to slip over the said seat 9, avoiding injury, plus either in injunction molding or in vacuum holding its construction is simpler than the wide seat 10.

If the sled is made of light weight sheeting plastic, its hull can be strengthened or stiffened, not only by the lips 7 and 8, but also by the whole outline of the sled (FIG. 11, #23) having a smoothly curved up-turned lip that would need to stick up no more than 1". Instead of sheeting, relatively thin, plastic construction, the sled can be built of thicker, injection-molded plastic such as polyethylene with longitudinal grooving (FIG. 1, #24), that provides strength to the hull on one hand, and stabilization of the ride on the other. Molded fiberglass, or a combination of fiberglass, aluminum edging and a light weight foam core can also be suitable materials in a more expensive construction to obtain maximum rigidity and proper combination of weight and buoyancy, specially when the device is intended for water skiing/sledding.

A stabilization down-pointing fin identified in FIG. 1 by the numeral 11, is shown in all the figures, and it has its purpose primarily when the device is used for water skiing/sledding towed by a boat, with the rider(s) facing the ski members 1 and 2 of the sled as in FIGS. 1, 2, 4, 5 and 6. The fin should not interfere with downhill snow sledding in either traveling direction. The fin 11 can be rivetted or screwed or bolted to the bottom of the hull as shown, in which case it can act as a heavy metallic ballast so after a tumble in the water that end of the sled is under water and the ski members 1 and 2 stick out over the water for easy location. Preferably, however, the fin 11 can be part of the single piece sled as an extrusion in the injection or in the vacuum molded plastic. In this case, it can be extruded as a hollow fin and then filled with a proper ballast.

Symmetrical sets of soft rubberized fixed straps are shown at different points in the different figures for use by the riders: Straps 12 and 13 of FIG. 1 may be used by the standing water skiing rider facing the tip of the ski members. When using the pair 12, the rider steps over the flattened strap 13. Strap 13 can also be used as a knee stop when gliding in the kneeling position facing the ski-like members as in FIG. 2. Straps 14 and 15 of FIG. 1 also in pairs, can be used to hold the rider's feet in the standing position as in FIG. 5 when the sled glides more horizontally over the water due to the weight distribution of two passengers as in that FIG. 5. In the same FIG. 5, the rear passenger is shown holding his/her feet under strap 13. Straps pair marked in FIG. 6 with the numeral 16 secures the front rider's feet when sitting in the mid-sled humped up seat, while in the same FIG. 6 the rear rider keeps his/her feet under strap 14. Straps pair marked in FIG. 7 by the numeral 17 hold the standing riders' feet when facing the wide section of the sled and the same straps pair is shown holding the rider's toes when kneeling as in FIG. 8 facing the same wide section of the sled.

Hooks 4 and 5 as in FIGS. 1 and 7 are provided facing down to avoid injury in the case of a tumble. They have the dual purpose of attachment of the tow rope in water gliding at the beginning of the ride (i.e. during mounting) each one to ride facing the sled in either opposite direction respectively, and in particular hook 5 can be provided with a string that in snow-sledding a child can hold (string identified with the numeral 18 in FIG. 10) as a rein or to pull the sled back up the hill at the end of the ride. A pair of reins (numeral 19 in FIG. 3) can be attached also at points 20 in the front of the ski members as in the same FIG. 3.

Figure 4:
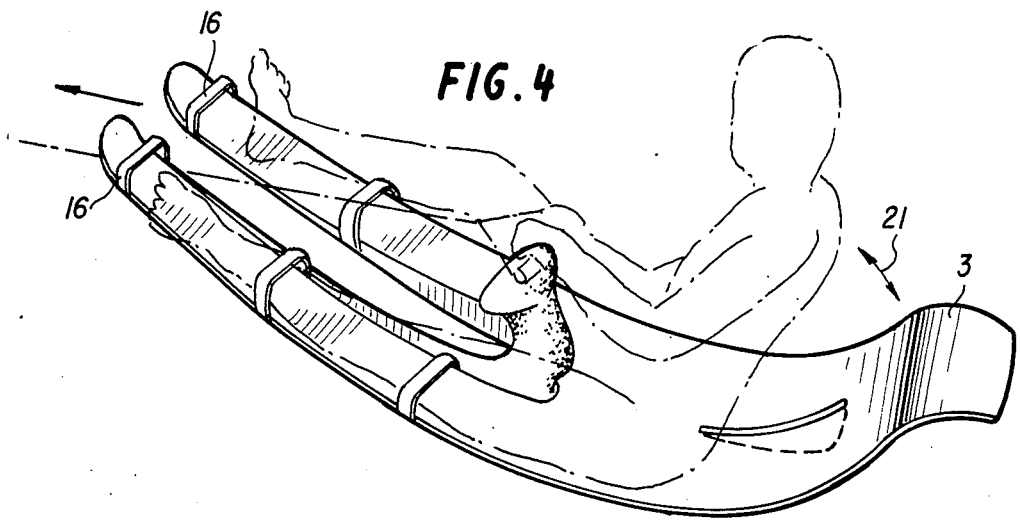
FIG. 4 is a perspective left lateral view of the same instant invention showing a sitting rider being pulled by the tow rope on water gliding.
Figure 5:
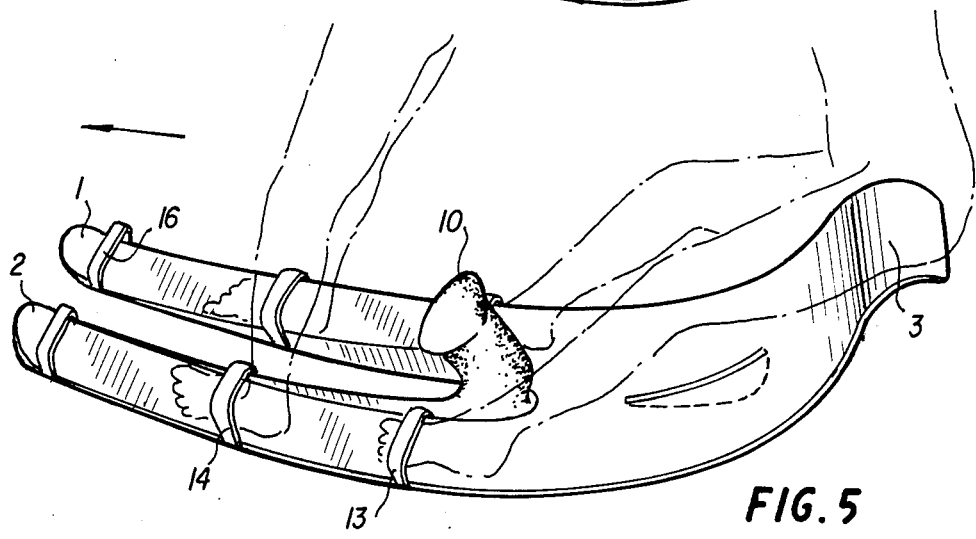
FIG. 5 is a left lateral view of the same instant invention in use on water gliding showing the rider who holds on to the tow rope standing in the front and a second rider sitting in the rear of the sled.
Figure 6:
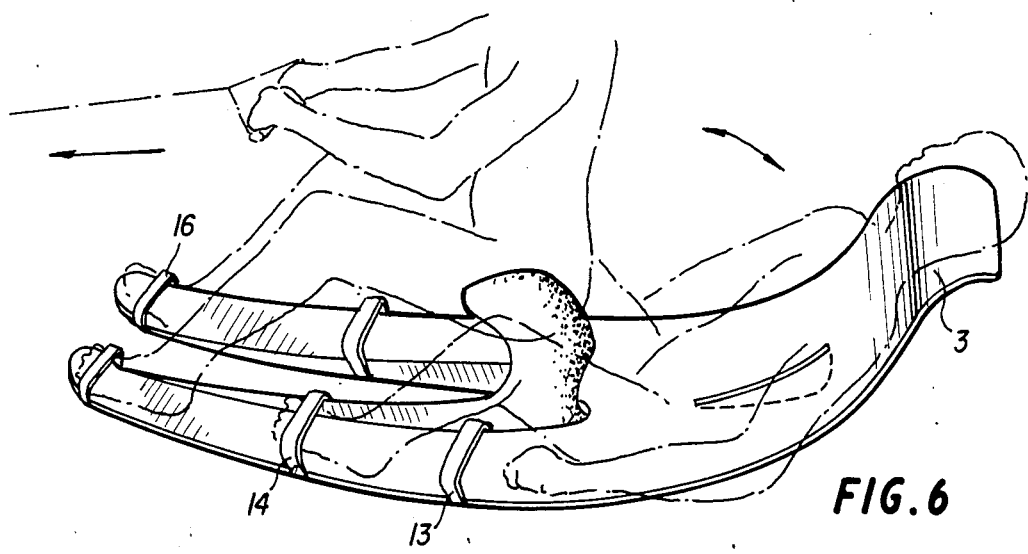
FIG. 6 is a left lateral perspective view of the same instant invention showing the rider who holds on to the tow rope sitting in the middle of the sled and a second rider lying (or sitting) in the rear.

Bidirectional arrow number 21 in FIG. 4 indicates that the sitting rider can also lay fully supine without changing the stability of the ride or weight distribution to lose control. Bidirectional arrow number 22 in FIG. 7 similarly indicates that the standing rider can also sit down on the humped up seat 9.

What I now claim is:

1. A one piece water and snow gliding board, a sled, biforked as a wishbone or letter Y, capable of supporting one or two riders, one behind the other, in the positions of standing, sitting, kneeling or lying, and capable of traveling in either of two opposite directions, comprising:
    a pair of ski-like members that represent the front of said sled when traveling in a first direction, front part that, as a fork, has the two said ski members symmetrical to one another with a free space in between and which measures, from the front tips of said skis to the point of bifurcation or crotch, ½ to 3/5 of the total length of said sled;
    a wide section that is the rear of said sled when traveling in said first direction, wide section that is approximately as wide as the combined width of the two said ski members plus their in-between free space, being the front-to-rear length of said wide section, from said crotch of said sled to its rear end 2/5 to ½ of the total length of said sled;
    a humped up seat, extruded out of the said crotch area of the said sled, seat that rises 12" to 16" above said sled and which is capable of accomodating one sitting rider when said sled travels in either of said opposite directions;
    an extruded up-turned lip that is formed, as a continuum, by the medial edges of the two said ski members, up-turned lip that starts at zero at the front of each ski member and gradually rises to 3" to 4" towards the said crotch of said sled, at which crotch area said lip is built up to form said humped-up seat;
    a vertical, down-pointing fin parallel with both said directions of traveling, located at the undersurface of the said wide section of said sled;
    a first foot receiving means for engaging the feet of the front rider traveling in said first direction when said rider sits on said humped-up seat with his/her feet placed over the front of the said ski members;
    a second foot receiving means for engaging the feet of the said front rider when said rider stands at mid-length of the said ski members and traveling in the said first direction with a second rider accomodated at the rear of said sled;
    a third foot receiving means for engaging the feet of a single standing rider when said rider places his/her weight on the sides of the said humped-up seat and traveling in the said first direction;
    a fourth foot receiving means for engaging the feet of the rider in various positions of standing, sitting and kneeling and facing the said rear of said sled and traveling in the said second direction;
    a first tow-rope engaging means shaped as a down-pointing hook and mounted at the front tip of the said humped-up seat, front of tip so considered when traveling in said first direction;
    a second tow-rope engaging means shaped as a down-pointing hook and mounted at the very rear of said sled, rear so considered when traveling in said first direction;
    a pair of hook/eye rings placed, each one respectively, at the very front tips of the said ski members, front tips so considered when traveling in said first direction.

2. The sled according to claim 1 where said wide section is gently up-curved, so in a longitudinal section it appears as a gentle letter S, being the highest point of such up-curved wide section the very rear end of said sled, and being elevated over the rest of said sled 10" to 15".

3. The sled according to claim 1 where the very outer edges of its outside perimeter are gently curved up rising approximately 1".

4. The sled according to claim 1 where the said front ski members and the said rear wide section have have frame-strengthening and ride-stabilizing ribs/grooves.

5. The sled according to claim 1 wherein said first through fourth foot receiving means comprise pairs of soft semi-elastic straps attached at symmetrical positions of said sled at re-positionable points to accomodate for various leg sizes of possible riders.

6. The sled according to claim 1 wherein the said humped-up seat at said crotch has a roughly triangular, rounded contour, longest in the direction parallel to the said first or second direction of traveling.

7. The sled according to claim 1 wherein its said entire ski members and said rear wide section consist of light weight plastic sheeting, containing as an upward extrusion its said humped up seat, and as a downward extrusion, its said vertical fin.

8. The sled according to claim 1 wherein its said entire ski members and said rear wide section consist of a double sheeting plastic material with an empty hollow core.

9. The sled according to claim 1 wherein its said entire ski members and said rear wide section consist of a double sheeting plastic material with a foam-filled core that also fills the said vertical, down-pointing fin, being said fin a continuation of said foam-filled, double sheeting sled at its said undersurface.

* * * * *